(12) United States Patent
Ikebukuro et al.

(10) Patent No.: US 10,617,103 B2
(45) Date of Patent: Apr. 14, 2020

(54) ROTOR BRAKING DEVICE FOR SPINNING REEL

(71) Applicant: Shimano Inc., Sakai, Osaka (JP)

(72) Inventors: Satoshi Ikebukuro, Osaka (JP); Kei Saito, Osaka (JP); Takuji Takamatsu, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/105,344

(22) Filed: Aug. 20, 2018

(65) Prior Publication Data

US 2019/0090467 A1 Mar. 28, 2019

(30) Foreign Application Priority Data

Sep. 22, 2017 (JP) .................................. 2017-181920

(51) Int. Cl.
*A01K 89/01* (2006.01)
*A01K 89/027* (2006.01)

(52) U.S. Cl.
CPC .................................. *A01K 89/027* (2013.01)

(58) Field of Classification Search
CPC .......................... A01K 89/027; A01K 89/0117
See application file for complete search history.

(56) References Cited

U.S. PATENT DOCUMENTS

| 5,524,832 A * | 6/1996 | Sakaguchi | ....... | A01K 89/01084 242/233 |
| 2002/0148918 A1 * | 10/2002 | Hirayama | .......... | A01K 89/0108 242/232 |
| 2004/0041044 A1 * | 3/2004 | Sugawara | .......... | A01K 89/0108 242/231 |
| 2004/0251361 A1 * | 12/2004 | Sugawara | .......... | A01K 89/0108 242/231 |
| 2005/0082405 A1 * | 4/2005 | Sugawara | ............. | A01K 89/01 242/223 |
| 2008/0149750 A1 * | 6/2008 | Kitajima | ................ | A01K 89/01 242/224 |

(Continued)

FOREIGN PATENT DOCUMENTS

| EP | 1393627 A1 * | 3/2004 | ......... A01K 89/0108 |
| EP | 1762142 A1 * | 3/2007 | ......... A01K 89/0108 |

(Continued)

*Primary Examiner* — Emmanuel M Marcelo
(74) *Attorney, Agent, or Firm* — Global IP Counselors, LLP

(57) ABSTRACT

A rotor braking device includes a moving member, a brake, and a protrusion. The moving member is disposed on the rotor so as to be capable of assuming a first position corresponding to a line-winding position and a second position corresponding to a line-releasing position in cooperation with a bail arm. The brake includes a friction portion rotatable relative to the reel body and frictionally engages the reel body, and a plurality of engagement portions that engage the moving member when the moving member moves to the second position, and brakes the rotation of the rotor when the moving member engages the engagement portions. The protrusion is on either the reel body or the friction portion, and in contact with the other of the friction portion or the reel body, and causes the friction portion to partially frictionally engage the reel body.

7 Claims, 7 Drawing Sheets

(56) References Cited

U.S. PATENT DOCUMENTS

2008/0308663 A1* 12/2008 Hiraoka ............. A01K 89/0108
                                                        242/233
2010/0187346 A1*  7/2010 Ochiai ............... A01K 89/0192
                                                        242/242
2013/0020424 A1*  1/2013 Camp ................ A01K 89/0108
                                                        242/230

FOREIGN PATENT DOCUMENTS

JP      4804314 B2    8/2011
KR   20070028236 A  *  3/2007  ......... A01K 89/0108

* cited by examiner

ROTOR BRAKING DEVICE FOR SPINNING REEL

CROSS-REFERENCE TO RELATED APPLICATIONS

This application claims priority to Japanese Patent Application No. 2017-181920, filed on Sep. 22, 2017. The entire disclosure of Japanese Patent Application No. 2017-181920 is hereby incorporated herein by reference.

BACKGROUND

Field of the Invention

The present invention relates to a rotor braking device for a spinning reel, particularly to a rotor braking device for a spinning reel that, in accordance with the pivoting of a bail arm, brakes a rotation of the rotor mounted on a reel body.

Background Art

In a spinning reel, a bail arm for guiding fishing line to a spool is pivotably mounted on a rotor. The bail arm is configured to be able to pivotably and moveably assume two positions: a line-winding position for winding the fishing line onto the spool, and a line-releasing (casting) position for releasing the fishing line wound on the spool.

If the rotor is able to freely rotate when the bail arm is in the line-releasing position, casting can be difficult, since the bail arm may return to the line-winding position. Thus, conventional devices are known in which a rotor braking device prevents and brakes a rotation of the rotor when the bail arm is in the line-releasing position.

For example, the rotor braking device disclosed in Japanese Patent No. 4804314 comprises a moving member that moves in forward and backwards directions in cooperation with the pivoting of the bail arm, and an annular braking member that frictionally engages the reel body so as to be relatively rotatable. The moving member brakes the rotation of the rotor by engaging the braking member when the bail arm is in the line-releasing position.

However, in the rotor braking device of Japanese Patent No. 4804314, the entire inner perimeter portion of the braking member that is mounted in a mounting groove contacts and frictionally engages the reel body, so that is the risk that the braking force becomes too large. In addition, if the outer diameter of the mounting groove and the inner diameter of the braking member change due to a manufacturing error or the like, the braking force could change significantly, which would make it difficult to produce a stable braking force.

SUMMARY

The object of the present invention is to stabilize the braking force in a rotor braking device for a spinning reel.

A rotor braking device for a spinning reel according to one aspect of the present invention that, in accordance with the pivoting of a bail arm, brakes a rotor that is rotatably mounted on a reel body. The rotor braking device comprises a moving member, a braking member, and at least one protrusion. The moving member is disposed on the rotor so as to be capable of assuming a first position corresponding to a line-winding position and a second position corresponding to a line-releasing position, in conjunction with movement of the bail arm. The braking member comprises a friction portion that is rotatable relative to the reel body and frictionally engages with the reel body, and a plurality of engagement portions that engage the moving member when the moving member moves to the second position, and brakes the rotation of the rotor when the moving member engages the engagement portions. At least one protrusion is disposed on either the reel body or the friction portion of the braking member, and is in contact with the other component. That is, the at least one protrusion is in contact with the other of the friction portion of the braking member or the reel body, and causes the friction portion to partially frictionally engage with the reel body.

In this rotor braking device of a spinning reel, since the friction portion partially frictionally engages the reel body, compared to a case in which the entire friction portion frictionally engages the reel body, it is possible to prevent the braking force from becoming too large and to produce a stable braking force. In addition, because it is possible to adjust the area in which the reel body and the friction portion frictionally engage each other with the protrusion, it is a simple matter to adjust and control the braking force.

Preferably, the other component, that is, the reel body or the friction portion of the braking member, frictionally engages the protrusion and a portion other than the protrusion. In this embodiment as well, it is possible to prevent the braking force from becoming too large and to produce a stable braking force in the same manner as described above.

In one embodiment, a plurality of protrusions is provided and the reel body or the friction portion of the braking member includes the plurality of protrusions. The other component, that is, the friction portion of the braking member or the reel body, frictionally engages only with the plurality of protrusions, when the moving member engages the engagement portion. In this embodiment, because the other component, that is, the friction portion of the braking member or the reel body frictionally engages only with the plurality of protrusions, it is possible to produce a more stable braking force.

Preferably, the braking member has an annular shape, a friction portion is formed on the inner perimeter side, and an engagement portion is formed on the outer perimeter side, and the reel body has a cylindrical portion onto which the braking member is mounted.

Preferably, the protrusions are integrally formed on the reel body and protrude from the cylindrical portion of the reel body toward the friction portion. In this embodiment, since the protrusions are integrally formed with the reel body, it is possible to reduce the number of parts.

Preferably, the protrusions are integrally formed with the friction portion of the braking member and protrude from the friction portion toward the cylindrical portion of the reel body. In this embodiment, since the protrusions are integrally formed with the braking member, it is possible to reduce the number of parts.

A spinning reel according to one aspect of the present invention comprises one of the rotor braking devices of a spinning reel described above.

According to the present invention, it is possible to stabilize the braking force in a rotor braking device of a spinning reel.

DETAILED DESCRIPTION OF THE EMBODIMENTS

First Embodiment

Figure 1:
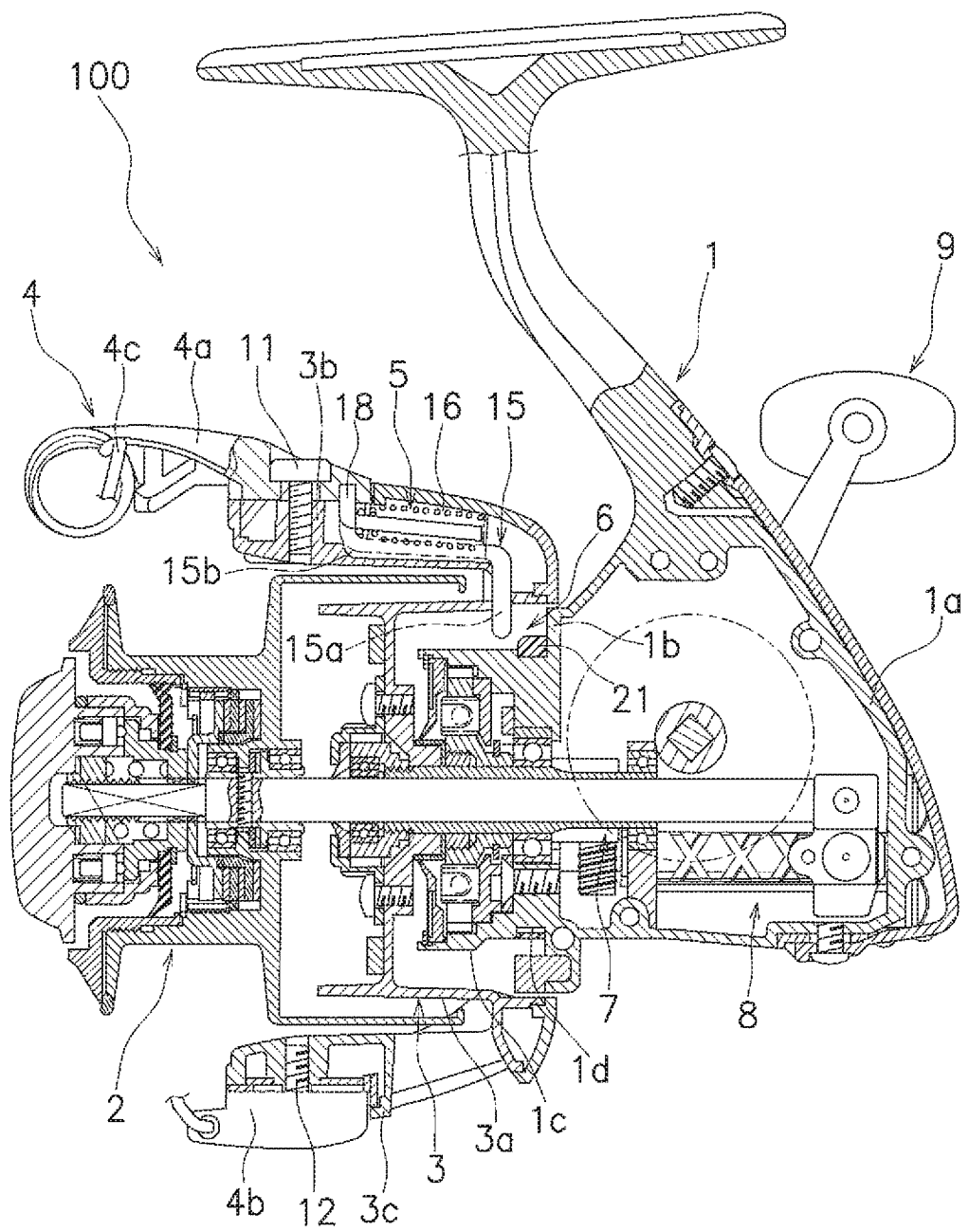
FIG. 1 is a longitudinal cross-sectional view of a spinning reel employing a first embodiment of the present invention.

FIG. 1 is a longitudinal cross-sectional view of a spinning reel 100 employing a first embodiment of the present invention. The spinning reel 100 comprises a reel body 1, a spool 2, a rotor 3, a bail arm 4, a bail reversing mechanism 5, and a rotor braking device 6.

As shown in FIG. 1, the reel body 1 comprises a reel body portion 1a with interior space, a flange portion 1b that is formed in front of the reel body portion 1a, and a cylindrical portion 1c that has a smaller diameter than the outer diameter of the flange portion 1b. The interior space of the reel body portion 1a houses, for example, a rotor drive mechanism 7 for driving the rotor 3, an oscillating mechanism 8 for uniformly winding a fishing line around the spool 2, etc. A mounting groove 1d having a smaller diameter than the outer diameter of the cylindrical portion 1c is formed on the cylindrical portion 1c. A handle 9 is rotatably mounted on the reel body 1.

The spool 2 is a member around the outer perimeter of which a fishing line is wound. The spool 2 moves in reciprocating fashion in forward and backward directions with respect to the reel body 1 as the handle 9 rotates, by an oscillating mechanism 8 that is disposed inside the reel body 1.

The rotor 3 is a member with which the fishing line is wound onto the spool 2. The rotor 3 comprises a rotor body portion 3a, a first rotor arm 3b, and a second rotor arm 3c. The first rotor arm 3b and the second rotor arm 3c are formed opposite each other across the rotor body portion 3a on the radially outer side of the rotor body portion 3a. The rotor 3 is rotated about the center axis of the spool 2 as the handle 9 rotates by the rotor drive mechanism 7.

The bail arm 4 is pivotably attached to the respective distal ends of the first rotor arm 3b and the second rotor arm 3c. The bail arm 4 pivots between the line-winding position shown in FIG. 2 and the line-releasing position shown in FIG. 3. The line-winding position is the position of the bail arm 4 for winding the fishing line onto the spool 2, and the line-releasing position is the position of the bail arm 4 for unwinding the fishing line that is wound on the spool 2.

The bail arm 4 comprises a first bail support member 4a, a second bail support member 4b, and a curved bail portion 4c that connects the first bail support member 4a and the second bail support member 4b. The first bail support member 4a is pivotably mounted on the first rotor arm 3b by a first mounting screw 11 that is threaded into the distal end of the first rotor arm 3b. The second bail support member 4b is pivotably mounted on the second rotor arm 3c by a second mounting screw 12 that is threaded into the distal end of the second rotor arm 3c.

The bail reversing mechanism 5 is disposed inside the first rotor arm 3b. The bail reversing mechanism 5 is used to hold the position when the bail arm 4 is in the line-winding position or the line-releasing position. In addition, the bail reversing mechanism 5 returns the bail arm 4 to the line-winding position in cooperation with the rotation of the rotor 3 when the bail arm 4 is in the line-releasing position.

As shown in FIGS. 1 to 5, the bail reversing mechanism 5 comprises a moving member 15, a toggle spring 16, and a switching member 17.

Figure 2:
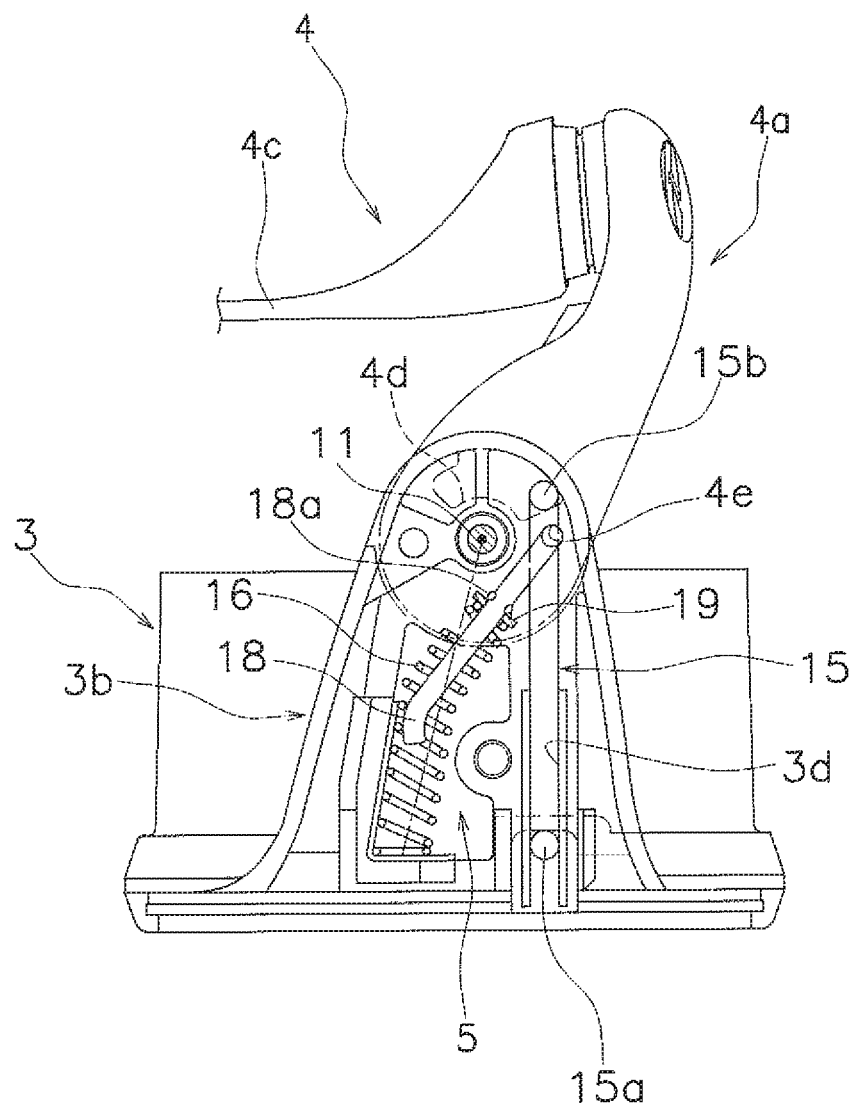
FIG. 2 is a side view of a first rotor arm that includes a bail arm in a line-winding position.
Figure 3:
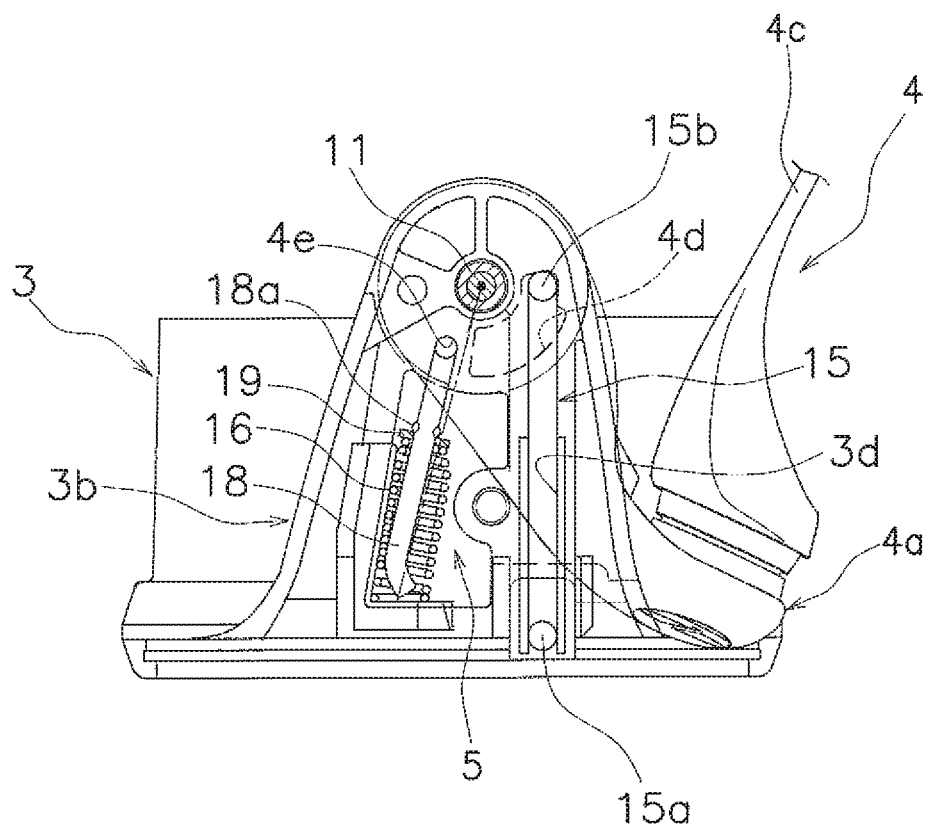
FIG. 3 is a side view of a first rotor arm that includes a bail arm in a line-releasing position.

The moving member 15 is made of, for example, a metal wire material, and, as shown in FIGS. 1 to 3, includes a first projecting portion 15a and a second projecting portion 15b, which are formed by bending the two ends by 90 degrees in different directions.

The first projecting portion 15a is bent toward the rotational center of the rotor 3. The second projecting portion 15b is bent in a direction away from the rotational center of the rotor 3 and is held in place by an engagement recess 4d that is formed in the first bail support member 4a.

The moving member 15 can move between a first position, shown in FIG. 2, and a second position, which is retracted from the first position, shown in FIG. 3, as the bail arm 4 pivots between the line-winding position and the line-releasing position. More specifically, the moving member 15 moves between the first position and the second position as the bail arm 4 pivots, by being guided by the engagement recess 4d and a guide portion 3d that extends in the front-to-back direction in the first rotor arm 3b.

The toggle spring 16 is a member that biases the bail arm 4 into either the line-winding position or the line-releasing position, and holds the bail arm 4 in the line-winding position and the line-releasing position. The rear end side of the toggle spring 16 is held in place by the first rotor arm 3b. The toggle spring 16 is a coiled spring member, and a portion of a rod 18 that extends along the first rotor arm 3b extends through the inside of the toggle spring 16 from the distal end side.

The rod 18 is biased toward the first bail support member 4a by the toggle spring 16. A locking projection 18a is disposed at the intermediate portion of the rod 18, and a washer 19 is disposed between the locking projection 18a and the distal end of the toggle spring 16. The distal end of the rod 18 is held in place by a latch hole 4e that is formed on the first bail support member 4a, and pivots about the pivot center of the first bail support member 4a as the first bail support member 4a pivots. The distance from the rear end side of the toggle spring 16 to the distal end portion of the rod 18 thereby capable of changing and the toggle spring 16 is compressed.

The dead point of the toggle spring 16 is the point of maximum compression of the toggle spring 16 when the distal end of the rod 18 is positioned on a straight line that connects the proximal end side center and the pivot center of the first bail support member 4a. The toggle spring 16 biases the bail arm 4 into either the line-winding position or the line-releasing position before and after the dead point.

Figure 4:
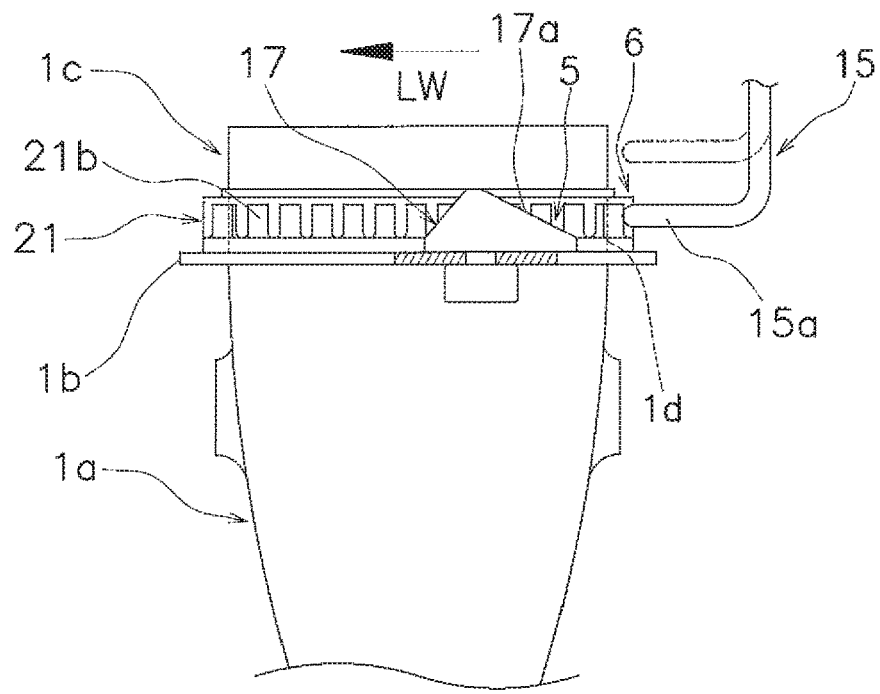
FIG. 4 is a partial side view of a reel body that includes a rotor braking device.
Figure 5:
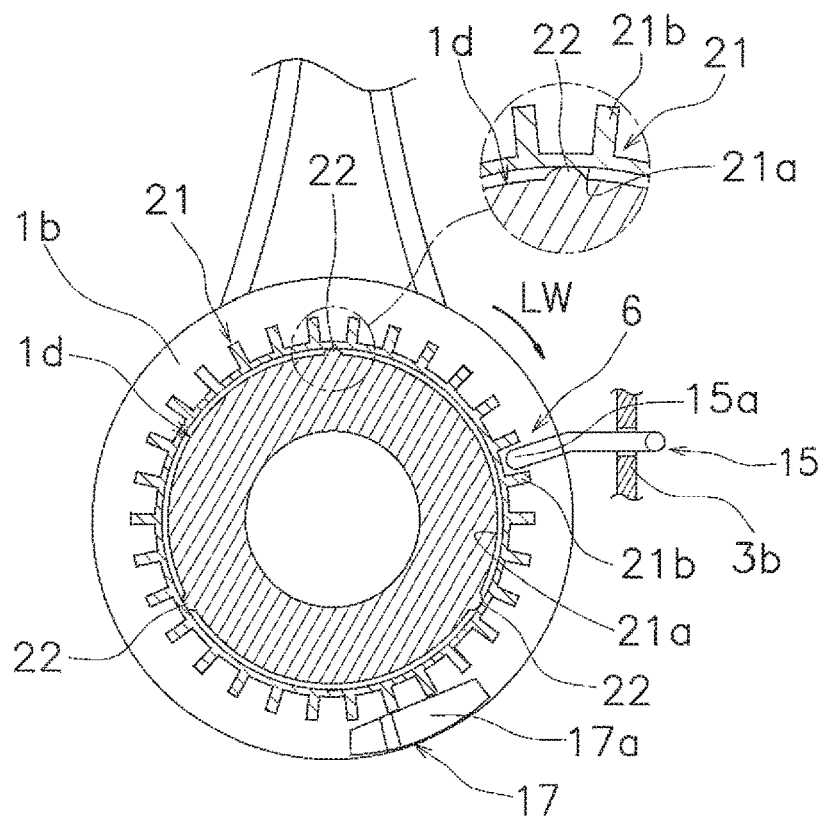
FIG. 5 is a partial front view of a reel body that includes a rotor braking device.

As shown in FIG. 4, the switching member 17 moves the moving member 15 from the second position, indicated by the solid line, to the first position, indicated by the broken line, in cooperation with a rotation of the rotor 3. As shown in FIG. 4 and FIG. 5, the switching member 17 is disposed on the flange portion 1b of the reel body 1. The first position of the moving member 15, indicated by the broken line in FIG. 4, corresponds to the first position of the moving member 15 shown in FIG. 2. Similarly, the second position of the moving member 15, indicated by the solid line in FIG. 4, corresponds to the second position of the moving member 15 shown in FIG. 3.

When the moving member 15 is in the second position, the switching member 17 comes into contact with the first projecting portion 15a of the moving member 15, when the rotor 3 rotates in the fishing line-winding direction LW and reaches a prescribed position. More specifically, the switching member 17 has an inclined surface 17a that is inclined in a direction in which the moving member 15 is gradually pushed upward in the first position direction (forward). When the first projecting portion 15a of the moving member 15 passes the inclined surface 17a as the rotor 3 rotates, the first projecting portion 15a of the moving member 15 is gradually pushed upward in the first position direction. Then, when the moving member 15 is pushed up to a position beyond the dead point of the toggle spring 16, the bail arm 4, which has been biased toward the line-releasing position side, is biased toward the line-winding position side, and, ultimately, the bail arm 4 returns to the line-releasing position.

Figure 6:
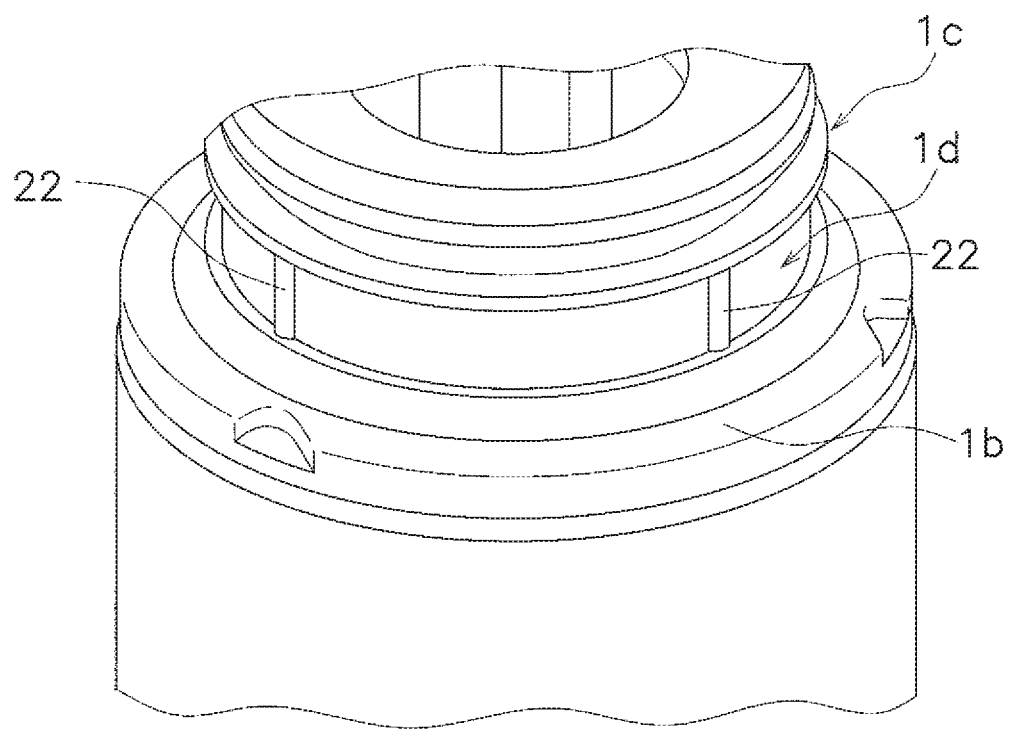
FIG. 6 is a perspective view of a cylindrical portion of the reel body.

The rotor braking device 6 brakes the rotation of the rotor 3 when the bail arm 4 is in the line-releasing position. As shown in FIG. 5 and FIG. 6, the rotor braking device 6 comprises a moving member 15, a braking member (or brake) 21, and at least one protrusion 22.

The moving member 15 constitutes a part of the bail reversing mechanism 5 as well as a part of the rotor braking device 6. The moving member 15 is disposed inside the first rotor arm 3b so as to be capable of assuming a first position corresponding to the line-winding position and a second position corresponding to the line-releasing position, in cooperation with the pivoting of the bail arm 4. As shown in FIG. 4 and FIG. 5, when moving from the first position to the second position, the first projecting portion 15a of the moving member 15 is positioned on the radially outer side of the braking member 21, and the distal end of the first projecting portion 15a engages the engagement portion 21b of the braking member 21, which will be described below.

The braking member 21 is mounted in a mounting groove 1d that is formed on the cylindrical portion 1c of the reel body 1. In the present embodiment, the braking member 21 is an annular member that can be elastically deformed, made of rubber, for example. The braking member 21 comprises a friction portion 21a and a plurality of engagement portions 21b.

The friction portion 21a is formed on the inner perimeter side of the braking member 21. The friction portion 21a is rotatable relative to the reel body 1 and frictionally engages the reel body 1. More specifically, the friction portion 21a rotates relative to the mounting groove 1d and frictionally engages the mounting groove 1d.

The plurality of engagement portions 21b are formed on the outer perimeter side of the braking member 21. More specifically, the plurality of engagement portions 21b are formed extending radially outwardly from the outer perimeter of the braking member 21 at predetermined intervals in the circumferential direction. When the bail arm 4 pivots to the line-releasing position, that is, when the moving member 15 moves to the second position, the plurality of engagement portions 21b engage the moving member 15. As a result, if the rotor 3 attempts to rotate when the bail arm 4 is in the line-releasing position, the friction portion 21a and the mounting groove 1d frictionally engage and brake the moving member 15; as a result, the rotation of the rotor 3 is stopped.

At least one of the protrusions 22 is provided to cause the friction portion 21a of the braking member 21 to partially frictionally engage the reel body 1. More specifically, the at least one protrusion is provided on either the reel body 1 or the friction portion 21a of the braking member 21, in contact with the other component, that is, the friction portion 21a of the braking member 21 or the reel body 1. As shown in FIG. 5 and FIG. 6, in the present embodiment protrusions 22 are integrally formed with the mounting groove 1d of the reel body 1, and protrude from the mounting groove 1d toward the friction portion 21a. In addition, the protrusions 22 protrude in an arc-like shape radially outward from the outer perimeter of the mounting groove 1d and extend along the axial direction. A plurality (for example, three) of protrusions 22 are formed on the mounting groove 1d of the reel body 1 at intervals in the circumferential direction. The protrusions 22 may be a member that can be subsequently mounted on the reel body 1 with a fixing element, such as by adhesion.

As shown in FIG. 5, the friction portion 21a of the braking member 21 comes into contact with and frictionally engages with the protrusions 22 in the mounting groove 1d. The outer perimeter portion of the mounting groove 1d other than the protrusions 22 and the friction portion 21a of the braking member 21 have a gap therebetween in the radial direction and are not in contact with each other. Accordingly, compared to a case in which the entire perimeter of the friction portion 21a frictionally engages the mounting groove 1d, the braking force is not too large, and it is possible to produce a stable braking force. In addition, even if there is variation in the outer diameter of the mounting groove 1d or the inner diameter of the braking member 21 due to manufacturing error or the like, because the friction portion 21a comes into contact with and frictionally engages the protrusions 22, the variation can be absorbed, and there is no risk that the braking force will change significantly, so that it is possible to produce a stable braking force.

Other Embodiments

A first embodiment of the present invention was described above, but the present invention is not limited to the above-described embodiment, and various modifications can be made without departing from the scope of the invention. In particular, the various embodiments described in the present Specification may be combined in any manner, as required.

Figure 7:
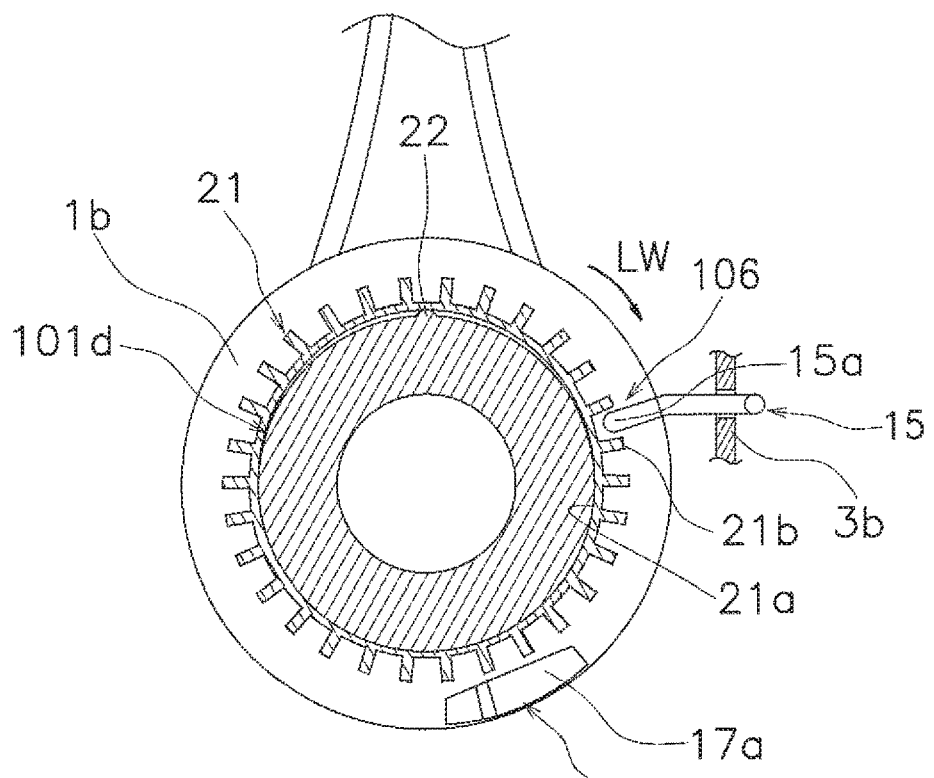
FIG. 7 is a view corresponding to FIG. 5 according to another embodiment.

In the above-described embodiment, a plurality of protrusions 22 is disposed in the mounting groove 1d, and the friction portion 21a of the braking member 21 is brought into contact with only the protrusions 22, but it is sufficient if one protrusion 22 is provided. For example, the rotor braking device 106 shown in FIG. 7 is configured such that only one protrusion 22 is disposed in the mounting groove 101d, and that the protrusion 22 and a portion other than the protrusion 22 frictionally engaged the friction portion 21a of the braking member 21. More specifically, the outer perimeter portion of the mounting groove 1d other than the protrusion 22 and the friction portion 21a of the braking member 21 have a gap therebetween in the radial direction, and are not in contact with each other in the vicinity of the protrusion 22, but are in frictional engagement with each other in the outer perimeter portions away from the protrusion 22. As a result, because the mounting groove 101d and the friction portion 21a of the braking member 21 partially frictionally engage each other, compared to a case in which the entire friction portion 21a frictionally engages the mounting groove 1d, the braking force is not too large, and it is possible to produce a stable braking force.

Figure 8:
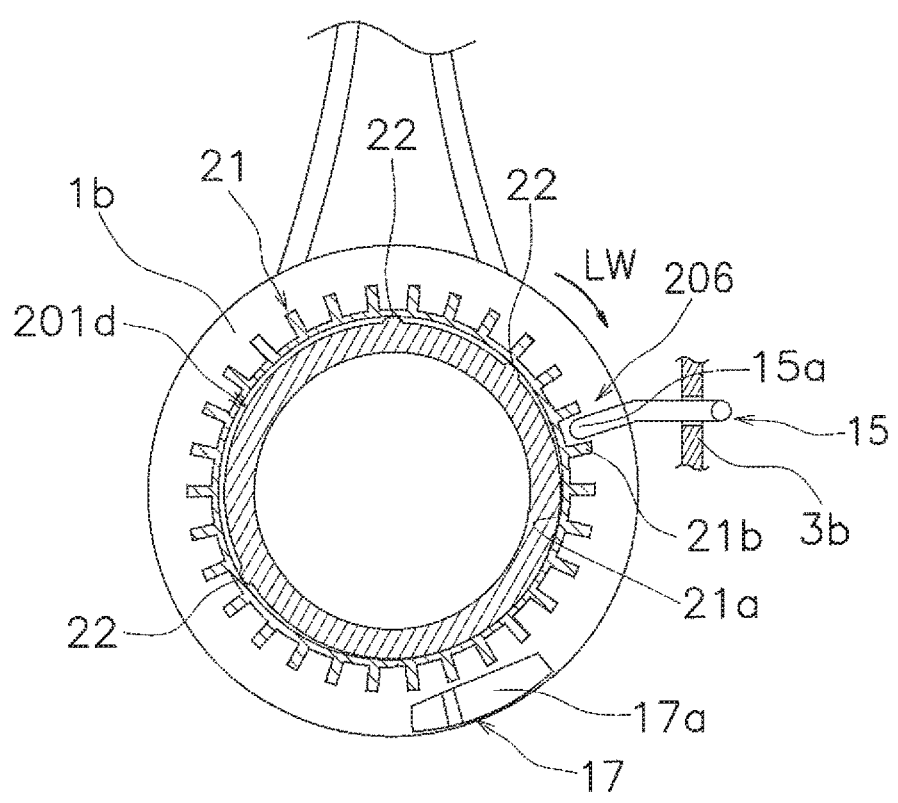
FIG. 8 is a view corresponding to FIG. 5 according to another embodiment.

In addition, as shown in FIG. 8, when a plurality of protrusions 22 is provided, the protrusions 22 may be disposed in the mounting groove 201d at unequal intervals. In the rotor braking device 206 in this embodiment, it is possible to adjust the braking force and to produce a more stable braking force by adjusting the gaps between the protrusions 22 and adjusting the range of frictional engagement at portions other than the protrusions 22. Manufacturing errors can thus be better absorbed, and it is possible to produce a more stable braking force.

Figure 9:
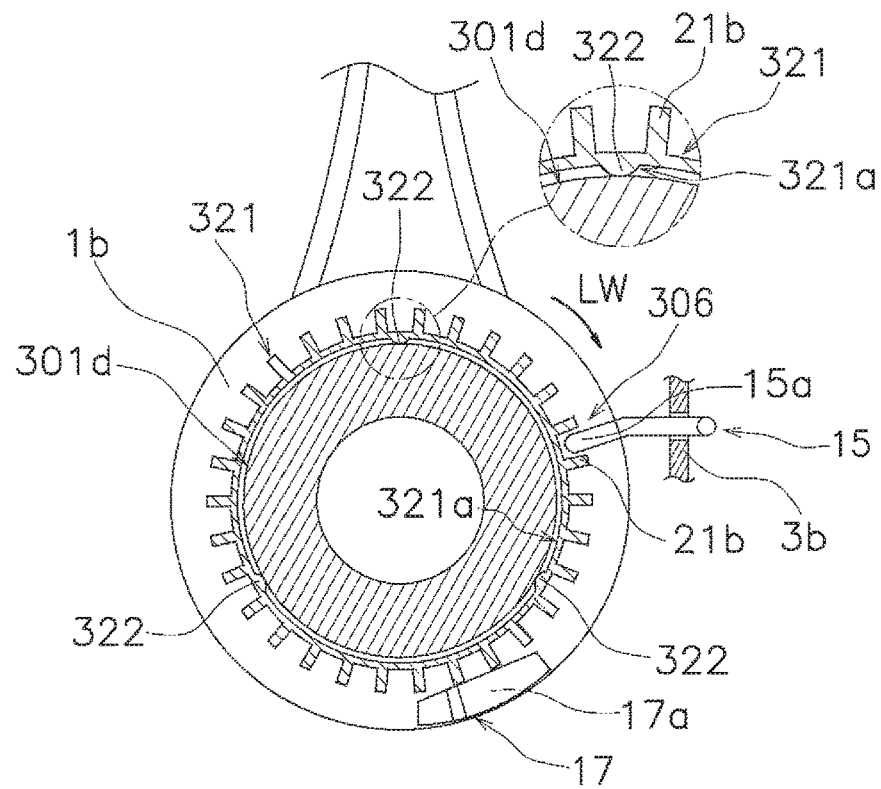
FIG. 9 is a view corresponding to FIG. 5 according to another embodiment.

In the above-described embodiment, the protrusions 22 are disposed in the mounting groove 1d of the reel body 1; however, a protrusion 322 may be disposed on a friction portion 321a of a braking member 321, as in the rotor braking device 306 shown in FIG. 9. In this case, it is not necessary to provide a protrusion 22 in the mounting groove 301d. The protrusion 322 protrude from the friction portion 321a of the braking member 321 toward the mounting groove 301d.

Figure 10:
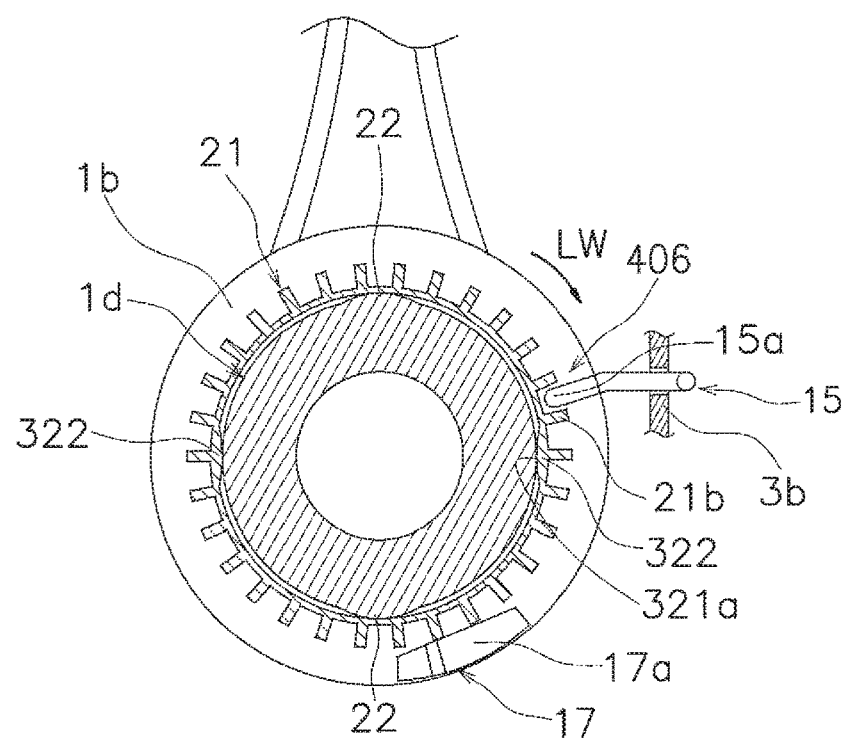
FIG. 10 is a view corresponding to FIG. 5 according to another embodiment.

In the above-described embodiments, the protrusions 22 are disposed in the mounting groove 1d of the reel body 1 or, as shown in FIG. 9, a protrusion 322 is disposed in the friction portion 321a of the braking member 321; however, in the rotor braking device 406 shown in FIG. 10, protrusions 22, 322 may be disposed both in the mounting groove 1d of the reel body 1 and on the friction portion 321a of the braking member 321. In addition, as shown in FIG. 10, the protrusions 22, 322 may extend further along the circumferential direction and more gently protrude than in the above-described embodiments.

What is claimed is:

1. A rotor braking device fora spinning reel that brakes a rotation of a rotor mounted on a reel body, comprising:
    a moving member disposed on die rotor so as to be capable of assuming a first position corresponding to a line-winding position and a second position corresponding to a line-releasing position in cooperation with the bail arm;
    a brake leaving a friction portion that is rotatable relative to the reel body and configured to frictionally engage the reel body, and a plurality of engagement portions configured to engage the moving member when the moving member moves to the second position, and brakes the rotation of the rotor when the moving member engages the engagement portions; and
    at least one protrusion integrally formed so as to be one piece with the reel body or the friction portion of the brake, in contact with the other of the friction portion of the brake or the reel body, and configured to cause the friction portion to partially frictionally engage the reel body, while enabling rotation therebetween.

2. The rotor braking device of a spinning reel according to claim 1, wherein
    the friction portion of the brake or the reel body of which the at least one protrusion is in contact, frictionally engages the protrusion and a portion other than the protrusion.

3. The rotor braking device of a spinning reel according to claim 1, wherein
    the at least one protrusion includes a plurality of the protrusions,
    either the reel body or the friction portion of the brake includes the plurality of the protrusions, and
    the other of the friction portion of the brake or the reel body frictionally engages only the plurality of the protrusions when the moving member engages the engagement portion.

4. The rotor braking device of a spinning reel according to claim 1, wherein
    the brake has an annular shape, the friction portion is formed on an inner perimeter side, and the engagement portion is formed on an outer perimeter side, and
    the reel body has a cylindrical portion onto which the brake is mounted.

5. The rotor braking device of a spinning reel according to claim 4, wherein
    the protrusions are integrally formed on the reel body and protrude from the cylindrical portion of the reel body toward the friction portion.

6. The rotor braking device of a spinning reel according to claim 4, wherein
    the protrusions are integrally formed on the friction portion of the brake and protrude from the friction portion toward the cylindrical portion of the reel body.

7. A spinning reel comprising:
    the rotor braking device according to claim 1.

* * * * *